Oct. 23, 1934.    C. OPOLO    1,978,114
DOUBLE ACTION AXLE
Filed March 22, 1934
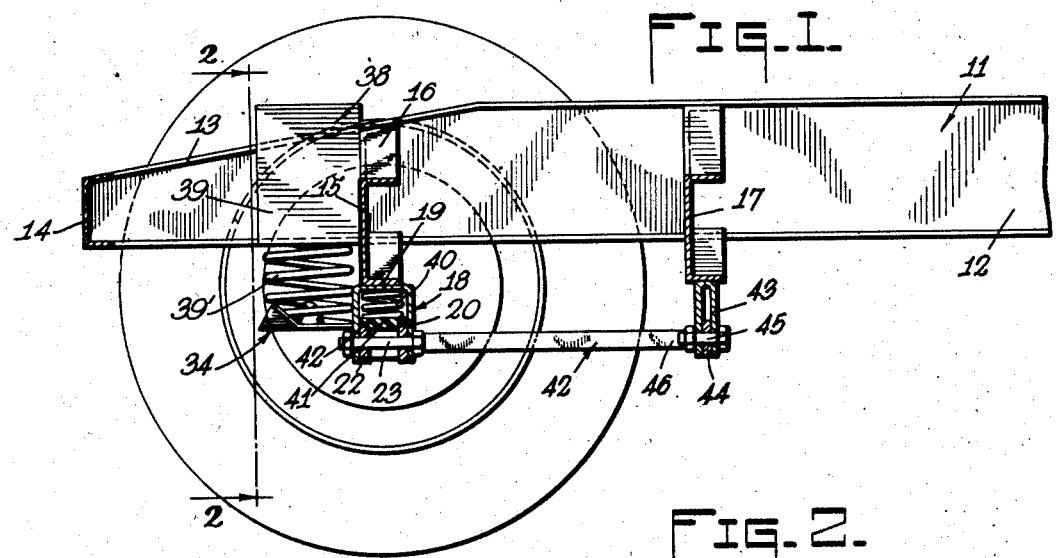
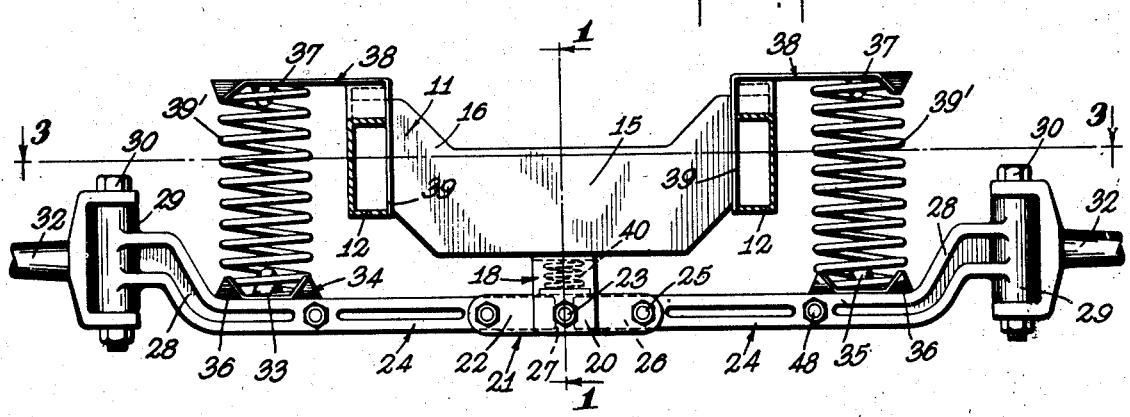
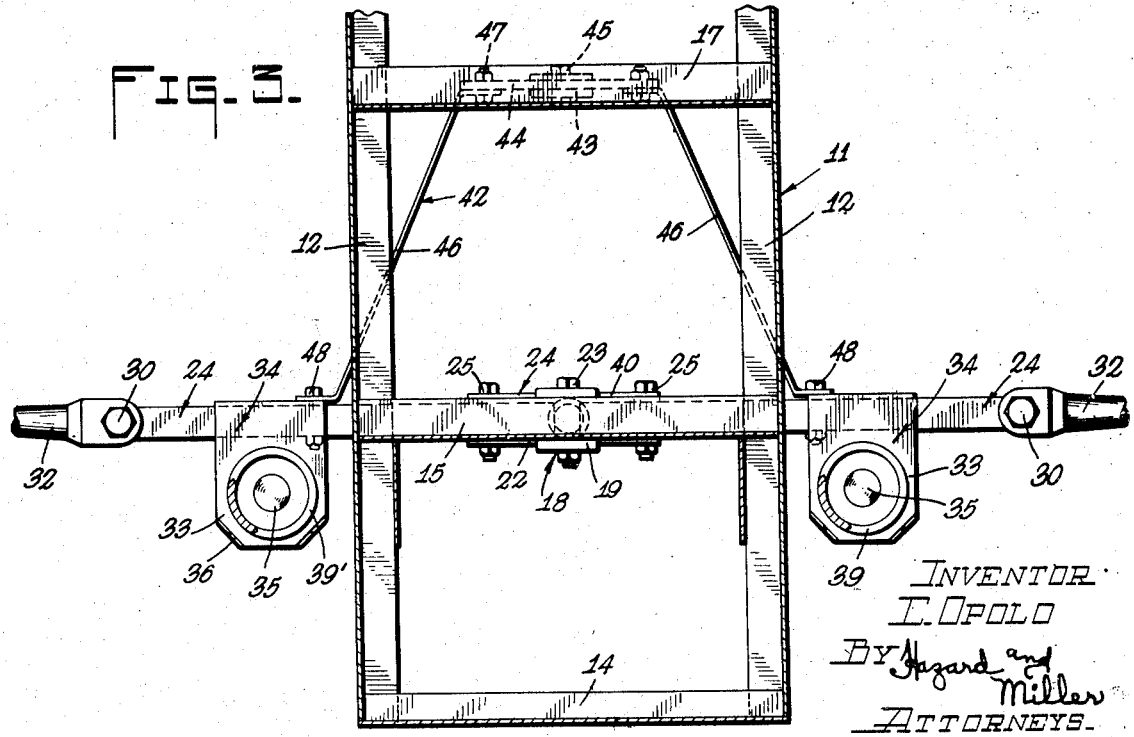
INVENTOR
C. OPOLO
By Hazard and Miller
ATTORNEYS Patented Oct. 23, 1934

1,978,114

UNITED STATES PATENT OFFICE 1,978,114

DOUBLE ACTION AXLE

Charles Opolo, Culver City, Calif.

Application March 22, 1934, Serial No. 716,831

8 Claims. (Cl. 267—20)

My invention relates to an axle for a vehicle, preferably for an axle in which the wheels are not propelled, such as the front steering wheels of a self-propelled vehicle, or all of the axles of a trailer.

An object and feature of my invention is providing an axle with a plurality of double pivoted connections to the vehicle frame and a further detailed feature of the construction is using a transverse lever pivoted to a rigid transverse member of the vehicle frame so that this lever may tilt in a vertical plane on a central pivot pin.

Another feature of my invention is that the main portion of the axle is divided into two parts and each part is pivoted to the end of the lever, the half axles also forming a lever having on the outer end, the mounting for the wheels and intermediate between this mounting and the vehicle frame there is a compression spring preferably of the coiled type, this providing two substantial springs to form the main spring suspension of the vehicle. The third compression spring is used to engage the inner end of the lever end of the half axles and is located preferably above the central pivot of the central lever so that this third spring resists the upward movement of the inner end of each half axle and thus compresses on the downward movement of a vehicle wheel in reference to the frame of the vehicle, thus, during the reaction of the wheels, in rising over bumps or falling into depressions in the road, the wheels on each side of the vehicle operate to a certain extent independently of the wheels on the other side except that the movement of the central lever by one axle in its movement reacts on the other half axle, thus bringing the main springs on both sides of the vehicle into action when the wheel on one side reacts to a bump or a depression in the road.

A further object and feature of my invention is the employment of radius rods, there being one for each half axle pivoted to the axle and pivoted to a transverse member on the vehicle frame. The pivoted connection of each radius rod to the vehicle frame is preferably in the same longitudinal line as the pivot of each half axle to the center oscillating lever.

My invention is illustrated in connection with the accompanying drawing, in which:

Fig. 1 is a longitudinal vertical section taken on the line 1—1 of Fig. 2 in the direction of the arrows, the center spring and pivots being shown in elevation.

Fig. 2 is a vertical transverse section on the line 2—2 of Fig. 1 in the direction of the arrows.

Fig. 3 is a horizontal section on the line 3—3 of Fig. 2 in the direction of the arrows.

In my invention, the vehicle frame is designated by the numeral 11 and has two side beams 12, each preferably being a channel having a downward taper 13 at the forward end and connected by a transverse front member 14. A transverse frame member 15 connects the two beams 12 rearwardly of the front member 14. This is illustrated as formed of a channel and has a drop section 16. A rear transverse member 17 also connects the two beams 12 and this is also illustrated as of a drop type and formed of a channel.

In my invention I employ a rigid center bracket 18 which is formed of a plate 19 and two depending ears 20. This, thus forms a U-shaped bracket which is welded or otherwise secured to the under side of the transverse drop frame 15.

The vertically oscillating lever 21 is formed of two side plates 22 pivoted to the bracket 18 by a pivot bolt 23. This bolt extends through the ears 20 and through each of the plates 22.

The half axle sections 24 are each pivoted by pivot bolts 25 to the outer ends of the oscillating lever 21 and each of these part axles has a lever end 26 which fits between the side plates 22 of the lever 21. Each of these lever ends terminates at 27 having a clearance at the pivot bolt 23. Each half axle has an upwardly bent section 28 and a vertical hub 29 through which extends the spindle 30, and on the spindle is secured a yoke having the wheel axle 32 on which the wheels are mounted.

A lower spring seat 33 is formed on a plate 34 attached to each half axle 24 preferably immediately inside of the drop section 28. Each spring seat has a center cone 35 and corner tabs 36. An upper spring seat 37 is formed of a horizontal plate 38 extending over the top of a beam 12 and having a vertical section 39 preferably secured to the flanges of a channel beam 12. This spring seat likewise has an inverted cone and tabs the reverse of that of the spring seat 33 and a coiled compression spring 39' fits between the two seats.

A center coil compression spring 40 is fitted in the bracket 18 and bears on the plate 19 and is housed between the two ears 20. This spring at the bottom has preferably secured thereto, a pressure plate 41 which is illustrated as having side notches 42. The side notches engage the side plates 22 of the oscillating lever 21 and the center portion of the plate 41 is located in a position to engage the inner portions of the lever ends 26 of the half axles 24. This spring 40 and the pressure plate 41 are preferably located vertically above the pivot bolt 26.

A radius rod assembly 42 employs a U-shaped bracket 43 secured to the center of the rear transverse frame 17, and a double lever 44 formed of a single bar is pivoted at 45 to the bracket 43. This lever may thus oscillate in a vertical plane. A radius rod 46 is pivoted at its rear end by a pivot pin 47 to the outer end of the double lever 44 and its forward end is pivoted at 48 to one of the half axles, the construction being the same as to both half axles of the vehicle. The pivots 47 at the rear end of the radius rod assembly are in longitudinal alignment with the pivots 25 and connect each half axle to the double lever 21.

Various changes may be made in the details of construction without departing from the scope of the invention as defined by the appended claims:

I claim:

1. In a vehicle, a vehicle frame, a transverse double lever pivoted to said frame, an axle element pivoted to each end of the said lever and a spring between each axle element and the vehicle frame, each axle element having a lever end extending towards the center of the transverse lever and a spring between each lever end and the vehicle frame.

2. In a vehicle as claimed in claim 1, a radius rod assembly having a radius rod pivotally connected to each axle element and pivotally connected to the frame.

3. In a vehicle, a vehicle frame having a transverse member, a transverse double lever pivoted at its center to said transverse member by a longitudinal pivot, an axle part pivoted to the outer end of each part of the double lever, a spring seat on each axle part, a complementary spring seat on the vehicle frame and a spring between said seats.

4. In a vehicle as claimed in claim 3, each axle part having a lever end extending inwardly from its pivotal connection to the double lever, the ends of the lever end being spaced from the pivot of the double lever and a spring between the transverse member and the said lever ends.

5. In a vehicle as claimed in claim 3, a second transverse member secured to the vehicle frame, a radius rod pivoted to each axle part, a second double lever pivoted at its center to the second transverse member and each radius rod being pivoted to said double lever.

6. In a vehicle, a vehicle frame having side beams, a transverse member, a bracket secured to the transverse member, a transverse double lever pivoted to the bracket by a longitudinal pivot, an axle part pivoted to each outer end of the transverse lever, a spring seat on each axle part, a complementary spring seat connected to each beam, and a spring between each pair of complementary spring seats.

7. In a vehicle as claimed in claim 6, each axle part having a lever end extending towards the center of the double lever and a spring housed in the bracket between each lever end and the transverse member.

8. In a vehicle as claimed in claim 6, a second transverse member connecting the beams, a second double lever pivoted to the second bracket by a longitudinal pivot, a radius rod pivotally connected to each axle part and to the outer end of the second transverse double lever.

CHARLES OPOLO.